Aug. 3, 1965

R. E. FRINK ETAL

3,198,906

CIRCUIT BREAKER WITH STORED ENERGY OPERATING MECHANISM

Filed Jan. 18, 1960

WITNESSES
John E. Healy, Jr.
William A. Elchik

INVENTORS
Russell E. Frink &
Paul Olsson
BY
ATTORNEY

United States Patent Office 3,198,906
Patented Aug. 3, 1965

3,198,906
CIRCUIT BREAKER WITH STORED ENERGY
OPERATING MECHANISM
Russell E. Frink, Forest Hills, and Paul Olsson, Penn
Hills, Pa., assignors to Westinghouse Electric Corporation, East Pittsburgh, Pa., a corporation of Pennsylvania
Filed Jan. 18, 1960, Ser. No. 2,994
13 Claims. (Cl. 200—92)

This invention relates to circuit breakers and more particularly to motor powered stored energy operating mechanisms for circuit breakers.

For some installations of moderate to high voltage air circuit breakers, it is desirable to have breakers requiring a relatively low amount of closing power. Thus, there is no need for a relatively large operating battery, or for control power transformers and the closing rectifiers that would otherwise be required for closing. This is particularly important in installations with only a small number of circuit breakers, as well as, in larger installations where the simultaneous closing of a number of breakers may be necessary. One way of minimizing closing power requirements is to provide a spring closing mechanism with a motor and reduction gear that takes approximately 5 to 10 seconds to charge the spring. By drawing closing power over a 5 to 10 second period rather than the 1/4 second required by a solenoid operated mechanism, the closing power demand is considerably reduced.

Accordingly, it is an object of the invention to provide an improved motor-operated spring closing mechanism for circuit breakers.

Another object is to provide a circuit breaker embodying an improved linkage for charging, latching and releasing stored-energy closing means.

Another object is to provide an improved motor-operated spring closing circuit breaker embodying two sets of linkages operatively connected together, one of which sets is releasable to effect an opening operation, the other set being releasable to effect a closing operation.

A further object is to provide a motor-operated spring closing circuit breaker embodying novel and improved means for automatically controlling the operation of the motor.

A still further object is to provide novel means for simultaneously operating the motor and brake of a circuit breaker embodying a motor-operated stored-energy closing mechanism.

Another object is to provide a circuit breaker embodying a stored-energy closing mechanism with improved interlocking means to prevent a closing operation under certain conditions.

Another object is to provide a circuit breaker, embodying a motor-operated stored-energy closing mechanism, with an improved control system for dependable and safe operation of the breaker.

A more general object is to provide an improved motor-operated stored-energy closing circuit breaker that is more reliable in operation than any heretofore used in the industry.

The novel features that are considered characteristic of the invention are set forth in particular in the appended claims. The invention itself, however, both as to structure and operation, together with additional objects and advantages thereof, will be best understood from the following detailed description thereof when read in connection with the accompanying drawings. In said drawings:

Figure 1:
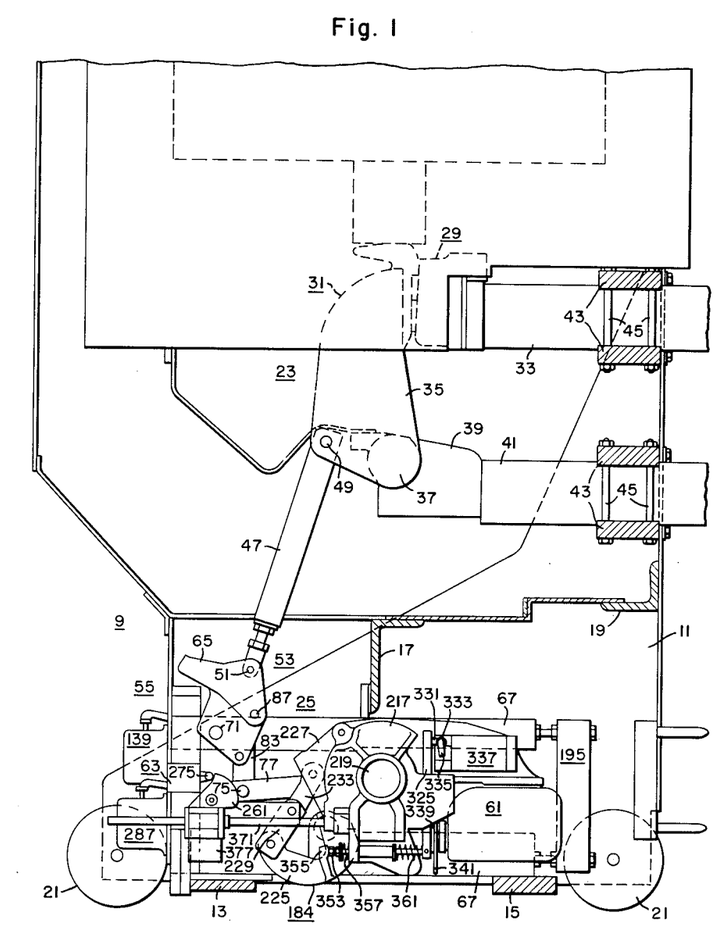
FIGURE 1 is a side elevational view, partly in section, of a circuit breaker embodying the principal features of the invention.

Referring to FIG. 1 of the drawings, a circuit breaker unit 9 is shown therein. The circuit breaker is of the roll-out type and is mounted on a truck comprising a pair of side plates 11 (only one being shown) which are rigidly joined by cross members 13, 15, 17 and 19 to form a rigid framework for supporting the circuit breaker 9. Wheels 21 are provided to facilitate rolling the circuit breaker into and out of a cell or cubicle.

The circuit breaker 9 is of the multi-pole type (only one pole being shown), and comprises a plurality of pairs of separable contact means (only one pair being shown) indicated generally at 23, and a common operating mechanism indicated generally at 25.

The contact means 23 is of the type described and claimed in the copending patent application of Russell E. Frink, Serial No. 702,576, filed December 13, 1957, now Patent No. 2,993,105 and assigned to the assignee of the present invention. For this reason, only a brief description of the contact means will be given. The contact means 23 includes a stationary contact assembly indicated generally at 29, and a movable contact assembly indicated generally at 31. Both the stationary contact assembly 29 and the movable contact assembly 31 comprise main, secondary and arcing contact means as described and claimed in the aforesaid application. The stationary contact assembly 29 is rigidly mounted on the inner end of an upper terminal stud 33. The movable contact assembly 31 is supported by a movable switch arm 35 pivotally supported at 37 on a casting 39 which is rigidly secured to the inner end of a lower terminal stud 41. The upper and lower terminal studs 33 and 41, are each rigidly clamped between a pair of supporting cross bars 43 by means of bolts 45. The cross bars 43 extend across all of the pole units and are supported between the side plates 11.

The movable switch arm 35 (there being a switch arm for each pole unit of the circuit breaker) is operatively connected by means of an insulating operating rod 47 to the operating mechanism 25. The upper ends of the operating rods 47 are pivotally connected by means of pivot pins 49 to the corresponding switch arms 35, and the lower ends of the operating rods are connected by pivot pins 51 to an operating lever 65 which is common to all of the pole units of the circuit breaker.

Referring to FIG. 1, the operating mechanism 25, comprises an operating linkage indicated generally at 53, a latching and tripping mechanism indicated generally at 55, a closing spring 57 (FIGS. 3 and 4), a spring closing linkage indicated generally at 59, a motor indicated generally at 61 and a latching and closing mechanism indicated generally at 63. The operating linkage 53, effects control of the operating rods 47 and movable switch arms 35 for all of the pole units of the circuit breaker. The operating linkage 53 is collapsed to effect opening of the circuit breaker by operation of the latching and tripping mechanism 55. The motor 61 is operated to effect compression of the closing spring 57 (FIGS. 3 and 4) through operation of the spring closing linkage 59. The spring closing linkage 59 is collapsed, to effect release of the charged closing spring and closing of the circuit breaker, by operation of the latching and closing mechanism 63. The operating linkage 53 is of the type specifically described and claimed in Patent No. 2,515,994, issued July 18, 1950, to Joseph D. Findley, Jr., Alvin W. Ogg and Fritz E. Florschutz, and assigned to the assignee of the present invention.

Figure 4:
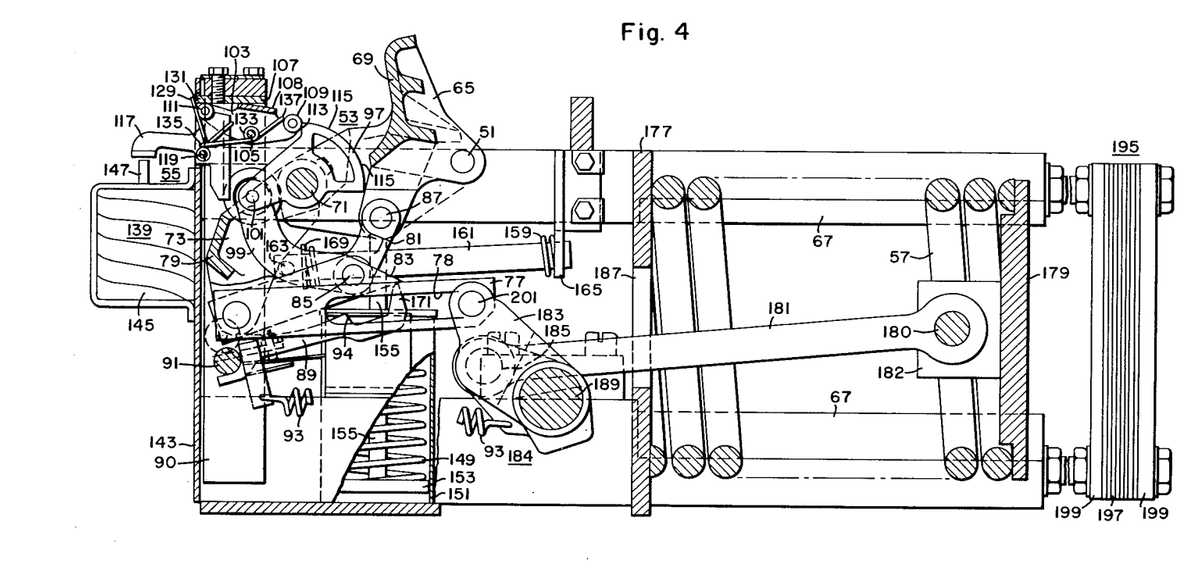
FIG. 4 is a sectional view taken along line IV—IV of FIG. 3.

As best illustrated in FIG. 4, the operating linkage 53 includes the operating lever 65 to which all of the operating rods 47 are connected. The operating lever 65 comprises two spaced lever parts (only one being shown) connected by a cross part 69. The operating lever 65 is pivotally supported on a shaft or operating center 71 which is rotatably supported in suitable bearings carried by two upper supporting rods 67 (only one of which is shown in FIG. 4). The operating linkage 53 also includes a closing lever 73 which is also pivotally supported on the operating center 71 and which is connected by a pivot pin 75 to a slotted link 77 having a slot 78 therein, which link connects the operating linkage 53 with the closing linkage 59. The closing lever 73 comprises two spaced lever parts (only one part being shown) connected by a cross part 79. The operating lever 65 and the closing lever 73 are operatively connected by means of a thrust transmitting toggle comprising toggle links 81 and 83, which are pivotally connected together by means of a knee pivot pin 85. The toggle link 81 is pivotally connected to the operating lever 65 by means of a pivot pin 87 and the toggle link 83 which comprises a pair of spaced parallel links is pivotally connected by means of the pivot pin 75 to the closing lever 73. The closing lever 73 is held in closed position (FIG. 2) by means of a latch 89 (FIG. 4) which is pivotally mounted on a rod 91 supported between two side plates 90 (only one being shown in FIG. 4). The latch 89 is biased by means of a spring 93 to latching position (FIGS. 2, 5 and 6) wherein a shoulder 94 (FIG. 4) formed by a recess therein, engages the pin 74.

The toggle 81, 83 is normally held in a slightly underset position by means of a latch member 97, which is pivotally mounted on the operating center 71 and which is connected to the knee 85 of the toggle by means of a link 99. The link 99 is comprised of two parts, only one of which is shown. The link 99 is pivotally connected at one end to the latch member 97 by a pivot pin 101, and at the other end to the knee pin 85 of the toggle 81, 83. The latch member 97 is normally releasably restrained in latching position by means of the latching and tripping mechanism 55.

The latching and tripping mechanism 55 (FIG. 4) includes a rocker latch 103 pivotally supported on a pivot pin 105 that is supported between two sides of a bracket 107. The rocker latch 103 comprises two identical side parts (only one being shown) joined by a cross part 108. The latch 103 has two rollers 109 and 111 at opposite ends thereof. The roller 109 engages a latch point 113 on the latch member 97 to releasably restrain the latch member in the latched position. The roller 109 rides over a cam surface 115 on the latch member 97 during a tripping operation. The latching and tripping mechanism 55 also includes a tripping latch 117 pivotally supported on a pivot pin 119 that is supported between the two sides of the bracket 107. The roller 111 of the rocker latch 103 is releasably restrained in a depression 123 (FIG. 6) in the tripping latch 117 and the roller 111 rides over a curved surface 125 (FIG. 4) of the tripping latch during a tripping operation. A torsion spring 127 is wrapped around the pivot pin 119 and has an end 129 that biases against a cross portion 131 of the bracket 107 to bias the tripping latch 117 in latching direction. A torsion spring 133 is wrapped around the pivot pin 105, and has one end 135 stressed over the spring 127, and the other end 137 biases the rocker latch 103 in latching direction.

The tripping latch 117 is adapted to be operated either manually or automatically to unlatching position to effect release of the operating mechanism 25 and opening of the circuit breaker, by means of a tripping solenoid indicated generally at 139. The tripping solenoid 139 comprises a bracket 141 secured to a front plate 143 which is secured to the four supporting rods 67 by suitable means. Supported within the bracket 141 is an energizing coil 145, a movable armature (not shown) and a trip rod 147 attached to the movable armature. When the coil 145 is energized, the movable armature (not shown) thrusts the trip rod 147 upwardly to engage and operate the trip member 117 in a clockwise direction.

A tripping force is applied to the operating linkage 53 by means of a tripping spring 149 disposed in a cylinder 151. A piston 153 disposed for reciprocal movement in the cylinder 151 is connected by means of a link 155 to the operating lever 65. The tripping spring 149 is compressed, when the circuit breaker is in the closed circuit position, between the piston 153 and a plate (not shown) secured to the upper end of the cylinder 151. The cylinder 151 and the piston 153 also serve as a dash pot to absorb the shock of the final opening movement of the operating mechanism 25.

When the circuit breaker is in the closed position (FIGS. 1, 2 and 5), the spring 149 (FIG. 4) through the operating lever 65, biases the operating linkage in a clockwise or tripping direction about the operating center 71. The biasing force of the spring 149 (FIG. 4) is transmitted by means of the underset toggle 81, 83 (FIGS. 2 and 5) to the closing lever 73 which is normally restrained in the position best shown in FIG. 5 by the latch 89. The force of the spring 149 (FIG. 4) therefore, tends to cause the toggle 81, 83 to collapse towards the right (FIG. 5) which collapse is prevented by the link 99 which is restrained by the latching mechanism. A component of force tending to collapse the toggle 81, 83 is applied through the link 99 to the latch member 97 tending to rotate this member in a counterclockwise direction. The latch member 97 is restrained from this tripping rotational movement by the slip-off type engagement of the roller 109 of the rocker latch 103 with the latch point 113 of the latch member 97. The rocker latch 103 is restrained from a tripping or counterclockwise movement by the engagement of the roller 111 of the rocker latch with the depression 123 (FIG. 6) of the tripping latch 117.

Figure 5:
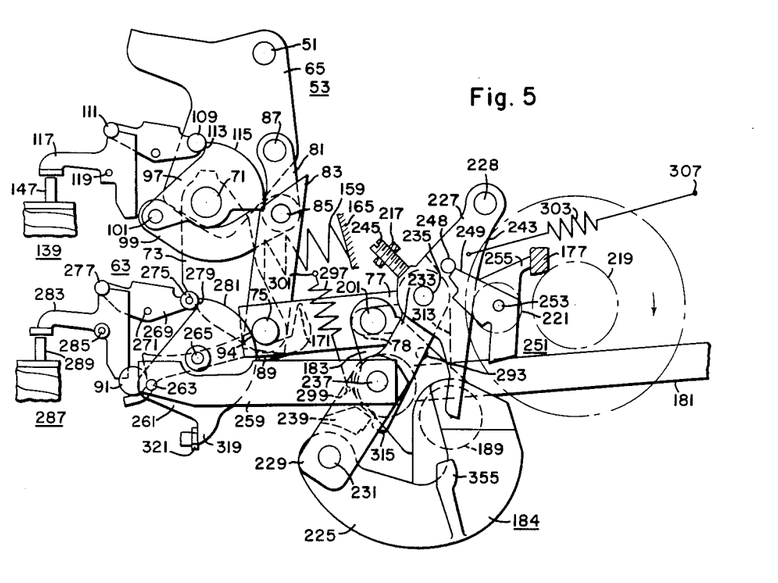
FIG. 5 is a schematic view of the operating linkage and spring-closing linkage, the linkages being shown in the closed circuit position with the closing spring charged.
Figure 6:
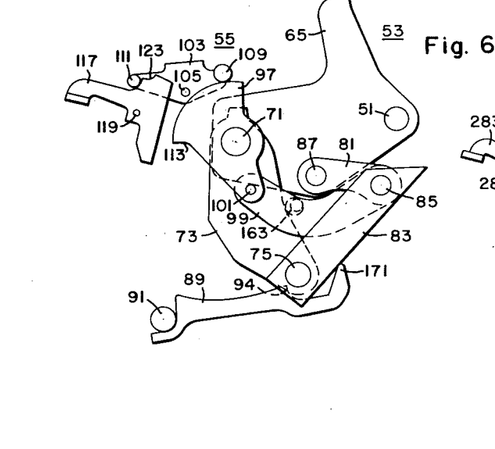
FIG. 6 is a schematic view of the operating linkage in the trip-free position.
Figure 7:
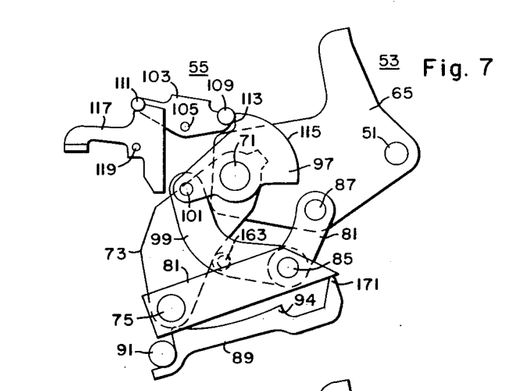
FIG. 7 is a view similar to FIG. 6 showing the operating linkage in the reset position.

The operation of the operating linkage 53 during a tripping and then a closing operation of the circuit breaker will be best understood with reference to the schematic showing of the operating linkage in FIGS. 5, 6 and 7. Referring to FIG. 5, the operating linkage 53 is shown in the closed circuit position. Upon the occurence of an abnormal condition, such for instance as an overload current in the circuit controlled by the breaker, the tripping solenoid 139 is energized by well known means, such, for instance, as a fault relay. When the tripping electromagnet 139 is energized, the movable armature (not shown) thrusts the trip rod 147 upwardly to engage and operate the tripping latch 117 in a clockwise or tripping direction. Clockwise movement of the tripping latch 117 disengages the rocker-latch roller 111 from the tripping-latch depression 123 (FIG. 6). When this occurs, the force tending to collapse the toggle 81, 83 (FIG. 5), a component of which is applied to the latch member 97 through the link 99, forces the rocker-latch roller 109 out of the path of counterclockwise movement of the latch point 113 of the latch member 97. The latch member 97 is then free to rotate in a counterclockwise tripping direction. Upon release of the latch member 97, the toggle 81, 83 immediately collapses under the influence of the tripping spring 149 (FIG. 4) which immediately rotates the operating lever 65 clockwise to the position in which it appears in FIG. 6. Clockwise rotation of the operating lever 65 effects opening movement of the operating rods 47, switch arms 35 and movable contact structures 31 for all of the pole units of the circuit breaker.

The toggle 81, 83 is reset to its underset position and the latch member 97 is reset and relatched during the opening operation. The resetting of the toggle 81, 83 and relatching of the latch member 97 is effected by means of a resetting spring 159 (FIG. 4). The spring 159 is coiled over a rod 161 which rod is attached at one end to a projection 163 on the lever 73. The free end of the rod 161 is slidably disposed in an opening in a bracket 165 which is rigidly connected to a supporting bar 67. The spring 159 is positioned between the bracket 165 and a washer 169 which is rigidly attached to the rod 161. When the circuit breaker is in the closed position, the resetting spring 159 is compressed between the washer 169 which is attached to the movable rod 161 and the bracket 165 that slidably supports the free end of the rod 161. During the collapse of the toggle 81, 83, the toggle link 83 engages a projection 171 of the latch 89 and moves the latch downward whereupon the shoulder portion 94 of the latch 89 is moved out of latching engagement with the pin 75. The operating linkage 53 is shown in the temporary trip-free position in FIG. 6. Upon release of the pin 75, the expanding spring 159 acts to move the lever 73 clockwise about the operating center 71, moving the pin 75 to the left to reset the toggle 81, 83. Movement of the pin 75 to the left causes, through the link 99, clockwise rotation of the latch 97 until it is relatched by the rocker latch 103. The operating linkage 53 is shown in the reset position in FIG. 7.

After the operating linkage 53 is reset and relatched following an automatic opening operation, the contacts are closed by release of the closing spring 57 (FIG. 4). The spring 57, as shown in FIG. 4, is compressed between a stationary plate 177 and a movable plate 179. The movable plate 179 is slidably disposed between slanted surfaces of four supporting rods 67 (only two being shown in FIG. 4). A movable rod 181 is pivotally attached by a pivot pin 180 to a projection 182 which is welded or otherwise attached to the movable plate 179. The other end of the movable rod 181 is pivotally attached to a crank shaft 184 by a pivot pin 185 which is shown in dotted lines in FIG. 4. A closing lever 183 is cast integral with the crank shaft 184. The movable rod 181 passes through an opening 187 in the stationary plate 177. A pivot 189 which is cast integral with the crank shaft 184, rotatably supports the closing lever at opposite ends thereof in bearings which are supported by two of the rods 67.

The circuit breaker is shown in FIG. 4 in the open position with the operating linkage 53 reset and the closing spring 57 charged. Upon the release of latching means which will be described later, the closing spring 57 expands thereby forcing the movable plate 179 and movable rod 181 to the right until the plate 179 strikes a bumper 195 that comprises a number of flat aluminum plates 197 that are bolted between two steel plates 199. Movement of the movable plate 179 and movable rod 181 to the right, as viewed in FIG. 4, effects clockwise rotation of the crank shaft 184 and its closing lever 183 about the pivot 189. During this movement of the closing lever 183, a pin 201 engages the slotted link 77 at the right hand end of the slot 78 therein (FIG. 4), and moves the link 77 and pivot pin 75 to the right effecting counterclockwise rotation of the lever 73 about the operating center 71. Since, at this time, the latch member 97 is restrained in latched position, the toggle 81, 83 is held by the link 99 in thrust transmitting position. The counterclockwise or closing movement of the lever 73 is, therefore, transmitted through the toggle 81, 83 to the operating lever 65 to rotate the lever 65 counterclockwise about the operating center 71 to operate the switch arms 47 (FIG. 1) for all of the pole-units to their closed positions. As the operating linkage 53 arrives at its closed position, the latch 89, urged by the spring 93 (FIG. 4), reengages the latch pin 75 to restrain the operating linkage 53 in the closed circuit position illustrated in FIGS. 1, 2, 5 and 9. The final closing movement of the operating mechanism is retarded by the spring 149 (FIG. 4) which is compressed during the closing operation.

Figure 8:
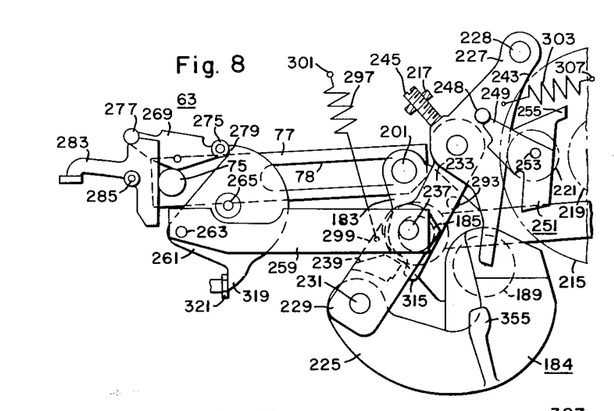
FIG. 8 is a schematic view of the spring-closing linkage in the charged position, the slotted link being shown in the position that it occupies when the breaker is open and the tripping linkage is reset.
Figure 9:
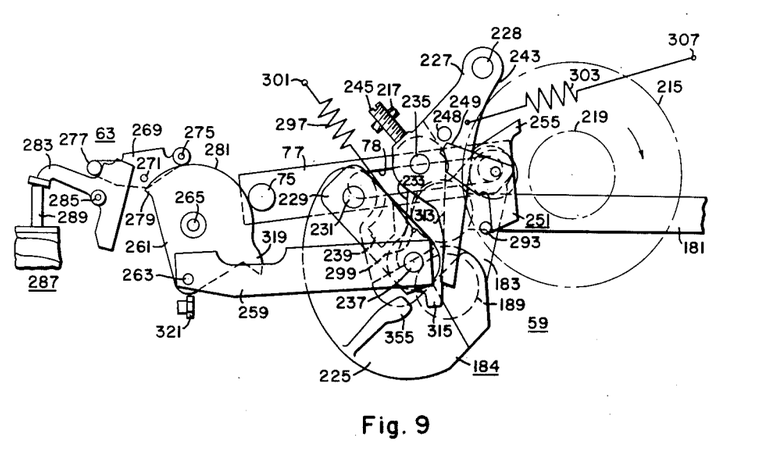
FIG. 9 is a view similar to FIG. 8 showing the spring-closing linkage in the discharged position and the slotted link in the position that it occupies when the breaker is closed.
Figure 10:
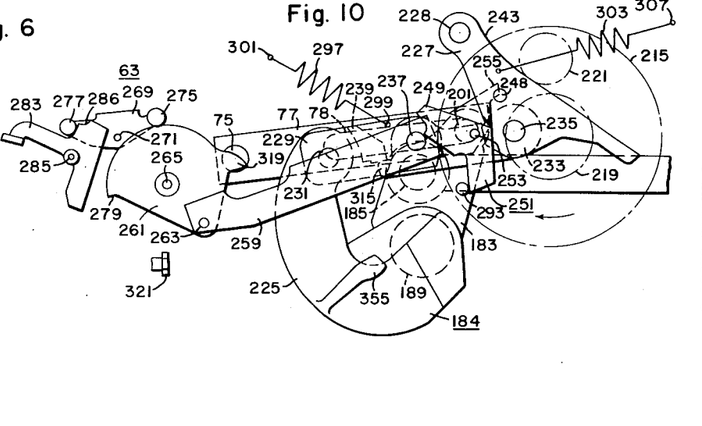
FIG. 10 is a view similar to FIGS. 8 and 9 showing the spring-closing linkage in the reset position and the slotted link in the position that it occupies when the breaker is closed.

The contact means of the breaker are trip-free of the closing means. That is, if, when the circuit breaker is operated to the closed position after a tripping operation, the overload condition has been cleared, the breaker will remain in the closed position. However, should the overload current still persist, the tripping electromagnet 139 will be energized to operate the tripping latch 117. This permits the operating linkage 53 and switch arms 47 for all of the pole units to move to the open position even though the closing spring 57 and closing linkage 59 are in the discharge or closed position. When the breaker trips open when the closing spring is discharged, the tripping linkage 53 does not immediately reset from the position shown in FIG. 6 to the position shown in FIG. 7. It will be recalled that if the breaker trips when the closing spring is charged, the tripping linkage resets immediately during the tripping operation. This does not happen when the breaker trips with the spring discharged because the slotted link 77 cannot move to the left from the positions in which it is shown in FIGS. 9 and 10. The slotted link 77, therefore, under the restraining force of the closing linkage 59, holds the tripping linkage 53 in the position in which it is shown in FIG. 6. As the closing spring is charged, however, the slotted link 77 moves from the position in which it is shown in FIGS. 9 and 10 to the position in which it is shown in FIGS. 4 and 8 allowing the tripping linkage 53 to move to the reset position in which it is shown in FIG. 7. The spring charging operation, which takes about 5 to 10 seconds, will be hereinafter described.

Novel means are provided for effecting operation of the closing spring 57. The electric motor 61 (FIGS. 1, 2 and 3) is supported alongside of the operating mechanism 25 by being bolted to a plate 211 that is cast integral with a metal housing 217 which is bolted to the outer sides of two of the supporting rods 67. The motor 61 operates a worm 213 (FIG. 3) that, in turn, operates a worm gear 215 which is shown in dotted lines in FIGS. 2 and 3, and shown schematically in FIGS. 5 and 9. The worm gear 215 is enclosed by the housing 217 and is rotatably supported by bearings (not shown) that are supported by the housing 217. A cam roller 221 shown in dotted lines in FIG. 2, and shown schematically in FIGS. 5, 8, 9 and 10, is rotatably mounted on the inner side of the worm gear 215. The motor 61, through the operation of the worm gear 215, cam roller 221, and closing linkage 59, effects charging of the closing spring 57.

Figure 2:
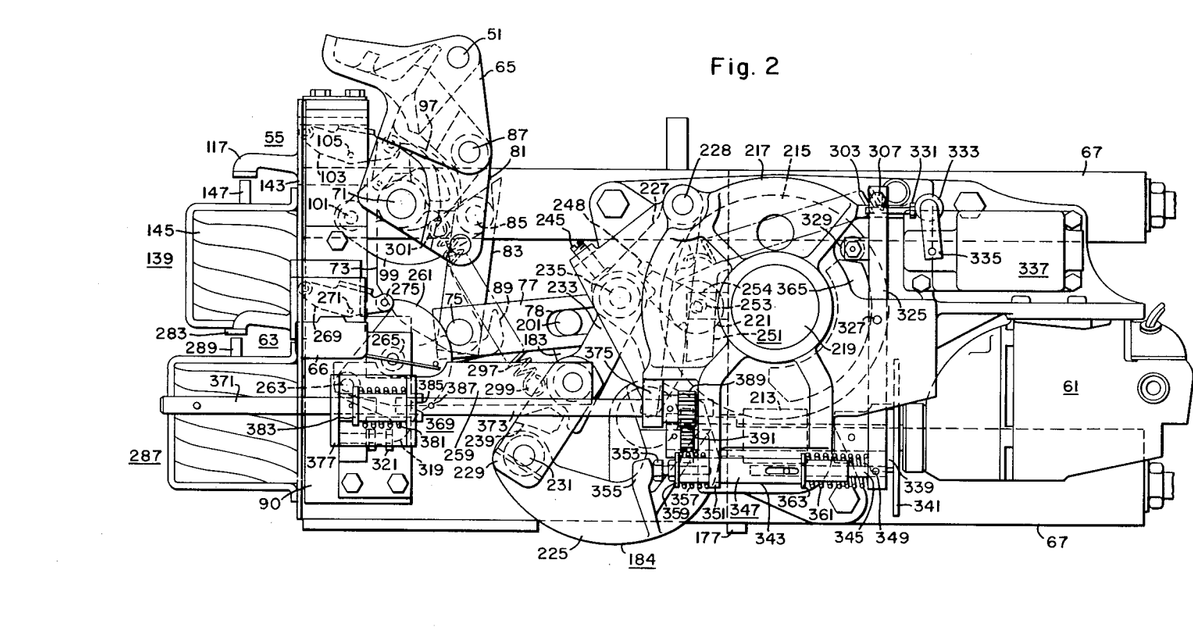
FIG. 2 is a side elevational view, on an enlarged scale, of the operating mechanism, the mechanism being shown in the closed circuit position with the closing spring charged or loaded.

Referring to FIG. 4, it was previously described that the closing lever 183 is cast integral with the crank shaft 184. A lever 225, as seen, for example, in FIG. 2, is also cast integral with the crank shaft 184. The lever 225 is connected to a cam lever 227 by a toggle comprising a link 229, which is connected to the lever 225 by a pivot pin 231, and a link 233 which is connected to the cam lever 227 by a knee pivot pin 235. The cam lever 227 is rotatably mounted on a pin 228 that is stationarily supported between the worm gear housing 217 and one of the supporting rods 67. The toggle links 229 and 233 are connected together by a knee pivot pin 237. It will be understood that the link 233 and the cam lever 227 also form a toggle 233, 227. The link 229 is formed of two identical portions joined together by a connecting portion 239 shown in dotted lines in FIGS. 2 and 5. The cam lever 227 is also formed of two parts joined together by a connecting portion that forms a cam surface 243 (FIG. 5) on which the cam roller 221 rides. In the position shown in FIGS. 2 and 5, clockwise rotation of the cam lever 227 about the pivot 228 is prevented by engagement of the lever with a stationary adjustable stop 245. The stop 245 is a threaded member that screws, for adjustment, through a threaded opening in an extension of the housing 217 (FIG. 2). As best seen in FIG. 5, counterclockwise rotation of the cam lever 227 is prevented by engagement of a projection 248 extending from the cam lever with a stop portion 249 of a stop member 251 that is pivotally mounted on a pin 253. The pivot pin 253 is mounted on a block 254 (shown in broken lines in FIG. 2) that is attached to the stationary spring retaining plate 177. The stop member 251 is biased in a clockwise direction about its pivot 253 by spring means (not shown). This clockwise rotation of the stop member 251 is limited by engagement of a stop portion 255, formed integral with the stop member 251, with the stationary spring retaining plate 177 (FIGS. 2 and 4). The lever 225 is a single lever fitting, for pivotal connection, between the two parts of the link 229, and the link 233 is a single link fitting for pivotal connection, at one end between the two parts of the link 229, and at the other end between the two parts of the link 227.

As viewed in FIGS. 2 and 5, the toggle 229, 233 is underset below a line through the pivots 231 and 235. In the charged position shown, the closing spring 57 (FIG. 4) exerts a force against the movable spring retaining plate 179 which force, through the rod 181, tends to rotate the crank shaft 184 and the lever 225 (FIGS. 2 and 5), which is integral with the crank shaft, clockwise. As most clearly illustrated in FIG. 5, clockwise rotation, however, of the lever 225 and crank shaft 184 can occur only upon the collapse of the toggle 229, 233 which collapse is prevented by a link 259, a latch member 261 and the latching and closing mechanism 63. The link 259 is pivotally connected at one end to the knee pivot 237 of the toggle 229, 233 and at the other end to the latch member 261 by a pivot pin 263. The latch member 261 is pivotally supported on a pivot pin 265 which is supported by one of the side plates 90 (FIG. 2). Counterclockwise movement of the latch member 261 is prevented, when the closing linkage 59 is in the latched position, by the latching and closing mechanism 63. This mechanism includes a rocker latch 269 pivotally supported on a pivot pin 271 that is supported between two sides of a bracket 273 (FIG. 2). As best illustrated in FIG. 5, the rocker latch 269 comprises two identical side parts joined by a cross part and has two rollers 275 and 277 at opposite ends thereof. The roller 275 engages a latch point 279 on the latch member 261 to releasably restrain the latch member in the latched position. The roller 275 rides over a cam surface 281 on the latch member 261 during a closing operation. The latching and closing mechanism 63 also includes a closing latch 283 pivotally supported on a pivot pin 285 that is supported between the two sides of the bracket 273. The roller 277 of the rocker latch 269 is releasably restrained in a depression 286 (FIG. 10) in the closing latch 283. Torsion springs (not shown) bias the rocker latch 269 and closing latch 283 into latching positions in a manner similar to that previously described in connection with the latching and tripping mechanism 55. The closing latch 283 may be operated either manually or automatically to unlatching position to effect a closing operation of the circuit breaker. For automatic closing a solenoid indicated generally at 287 is provided to thrust a rod 289 upwardly upon energization of a coil (not shown) to engage and operate the closing latch 283 in a clockwise direction.

As most clearly illustrated in FIG. 5, the closing latch 283 prevents counterclockwise rotation of the rocker latch 269. This prevents counterclockwise rotation of the latch member 261 which, through the link 259, prevents collapse of the toggle 229, 233. This prevents clockwise rotation of the lever 225 and crank shaft 184 under the bias of the charged closing spring 57 (FIG. 4). The closing spring is, in this position, exerting a force against the movable plate 179 (FIG. 4) tending to move the plate 179 and rod 181 to the right to rotate the crank shaft 184 clockwise about the pivot 189.

The operation of the complete operating mechanism 25 will be best understood with reference to FIGS. 5 to 10. The operation will be more clearly understood with the understanding that the operating linkage 53 and the closing linkage 59 are connected by the slotted link 77 which link is connected, at one end, to the pivot pin 75 of the levers 73, 83, and, at the other end, to the pivot 201 of the closing lever 183. With reference to the closing linkage 59, it should be understood that the closing lever 183 and the lever 225 are both cast integral with the same crank shaft 184.

Figure 3:
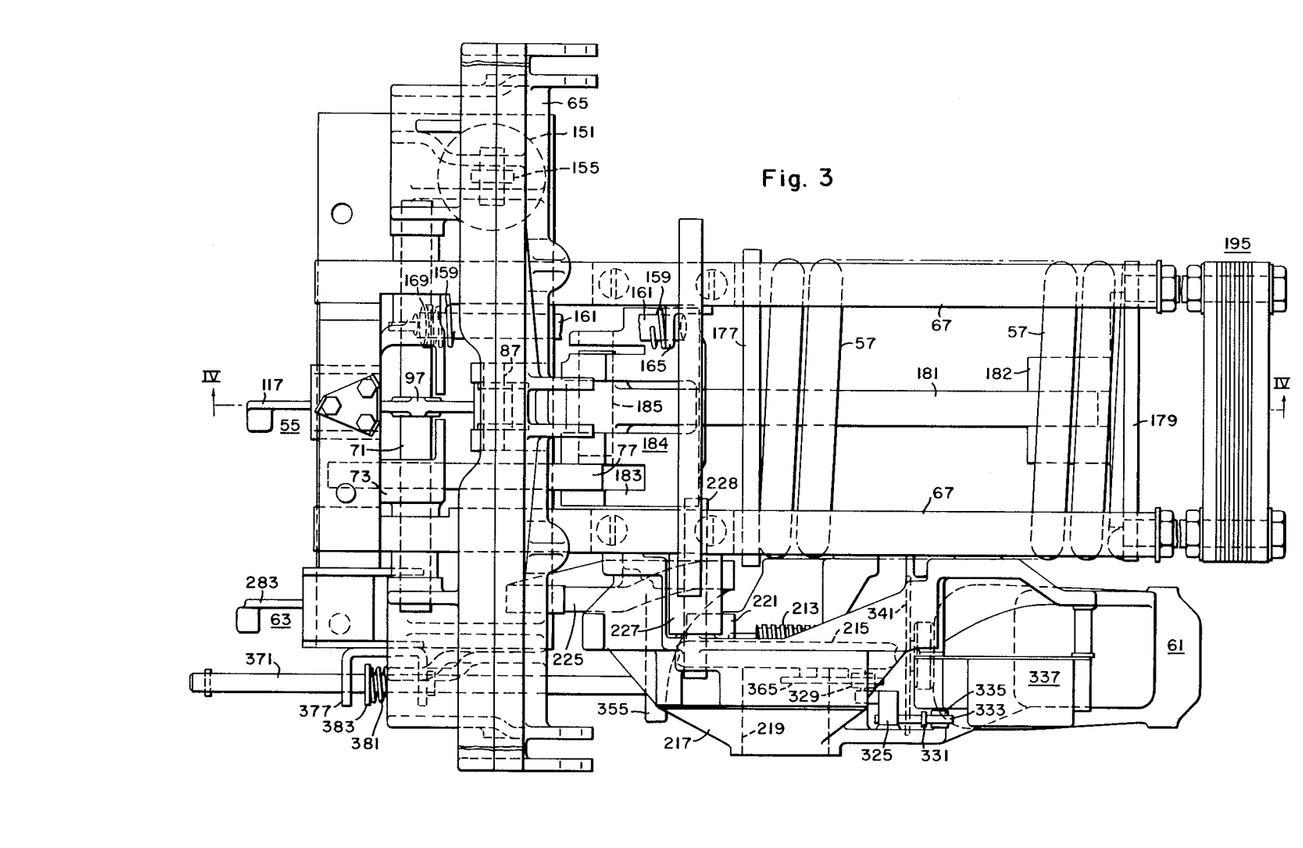
FIG. 3 is a top plan view of the operating mechanism of FIG. 2, the mechanism being shown in the open circuit position with the closing spring charged or loaded.

In FIG. 5, the operating linkage 53 is shown in the closed position, and the spring closing linkage 59 is shown in the charged position. Upon the occurrence of an overload current above a certain predetermined value, the tripping solenoid 139 is energized to thrust the rod 147 upwardly to engage the tripping latch 117 to effect a tripping operation. During this tripping operation, the operating linkage goes, for an instant, to the trip-free position shown in FIG. 6 and then to the reset position shown in FIG. 7 in the manner hereinbefore described. As the operating linkage 53 moves to the reset position, the slotted link 77 (FIG. 8) is carried by the pivot 75 of the operating linkage 53 to the position in which it is shown in FIG. 8. With the operating linkage 53 in the reset position shown in FIGS. 4 and 7, and the closing linkage 59 in the charged position shown in FIGS. 4 and 8, the operating mechanism 25 is in position for a closing operation under the force of the charged closing spring 57 (FIGS. 3 and 4).

Upon energization, at this time, of the closing solenoid 287, the rod 289 is thrust upwardly engaging the closing latch 283 rotating this latch clockwise to disengage the roller 27 to release the rocker latch 269. The engagement of the roller 275 of the latch member 261 is of the slip-off type, and upon release of the rocker latch 269, the latch point 279 of the latch member 261, slips-off of the roller 275 releasing the latch member 261, to permit a closing operation. Upon release of the latch member 261, the link 259 (FIG. 8) is free to move to the right allowing collapse of the toggle 229, 233 which, in turn, permits clockwise rotation of the lever 225 and crank arm 184 under the expanding force of the charged closing spring 57 (FIG. 4). The closing spring 57 then expands forcing the movable plate 179 and rod 181 to the right rotating the crank arm 184 in a clockwise direction and moving the closing linkage 59 to the discharged position shown in FIG. 9.

Turning again to FIGS. 4 and 8, it will be seen that the pin 201 is at the extreme right end of the slot 78 of the slotted link 77. Therefore, as the crank shaft 184 is rotated clockwise by the expanding closing spring 57 (FIG. 4), the closing lever 183, which is cast integral with the crank shaft 184, rotates clockwise, moving the pin 201 and the slotted link 77 to the right. Since the operating linkage 53 is, at this time, in the reset position, movement to the right of the slotted link 77 and the pin 75, rotates the operating linkage 53 counterclockwise about its operating center 71 operating the switch arms 47 (FIG. 1) for all of the pole-units to their closed positions in the manner hereinbefore described. The operating linkage 53 is shown in the closed position in FIG. 5 and the closing linkage is shown in the collapsed or discharged position in FIG. 9.

The collapsed or discharged position of the closing linkage 59 (FIG. 9) is only temporary, and this linkage must be reset to the thrust transmitting position shown in FIG. 10 before the closing spring 57 can be charged for another closing operation. As the closing linkage collapses from the position in which it is shown in FIG. 8, a projection 293 on the closing lever 183, strikes a tail portion 295 on the stop member 251 rotating the stop member 251 counterclockwise to move the stop portion 249 of the stop member out of blocking relation with the stop portion 248 of the cam lever 227 to the temporary position shown in FIG. 9.

As shown in FIG. 9, the collapsed toggle 229, 233 is being biased toward its thrust transmitting position by a spring 297. The spring 297 is connected at one end to a projection 299 on the toggle link 229 and, at the other end, to a pin 301 (FIG. 2) which is welded or otherwise attached to the supporting rod 67. In the position shown in FIG. 9, the collapsed toggle 233, 227 is being biased toward the right by a spring 303 which is attached at one end to a projection 305 on the cam lever 227 and, at the other end, to a pin 307 (FIG. 2) that is welded or otherwise attached to the supporting rod 67. The toggle 229, 233 and the toggle 233, 227 are prevented from moving to their thrust transmitting positions by the cam roller 221, which engages the cam surface 243 of the cam lever 227, preventing counterclockwise movement of the cam lever 227 about its pivot 228. The collapsed position of the closing linkage as shown in FIG. 9 is only temporary. Upon the closing of the circuit breaker, the motor 61 (FIGS. 1, 2 and 3), is started in a manner to be hereinafter described. The motor 61 rotates the worm 213 (FIG. 3) to effect clockwise rotation of the worm gear 215. As the worm gear 215 rotates carrying the cam roller 221 with it, the cam lever 227, no longer being stopped by the cam roller 221, moves counterclockwise about its pivot allowing the toggles 233, 227 and 229, 233 to move to their thrust transmitting positions under the bias of the springs 303 and 297 respectively. The spring 303 pulls the knee pivot 225 of the toggle 233, 227 to the right until this movement is stopped by engagement of a portion of the single lever 233 with a stop portion 313. The stop portion 313 is a connecting member which extends between the two like parts of the double cam lever 227. The spring 297 pulls the knee pivot 237 of the toggle 229, 233 upwards until this movement is stopped by engagement of a projection 315 on the single link 233 with the cross member 239 that connects the two identical parts of the double link 229. The closing linkage 59 is, at this time, in the thrust transmitting position shown in FIG. 10. In this position, the toggle 229, 233 is overset with the knee pivot 237 being above a line drawn through the pivots 231 and 225.

The positions of the parts of the closing linkage 59 as shown in FIG. 10 are only temporary because, at this time, the worm gear 215 is being rotated in a clockwise direction. The worm gear rotates carrying with it the cam roller 221 which, before a complete revolution is made, engages the lower portion of the cam surface 243 of the cam lever 227. Further rotation of the worm gear 215 then moves the cam roller 221 to drive the cam lever 227 in a clockwise direction around its pivot 228. This movement of the cam lever 227, through the overset thrust transmitting toggle 229, 233, rotates the lever 225 counterclockwise about its pivot 189. Because the lever 225 is cast integral with the crank shaft 184, the crank shaft also moves counterclockwise pulling the rod 181 (FIG. 4) and movable spring retaining plate 179 to the position shown in FIG. 4 wherein the closing spring 57 is shown in the charged position.

Clockwise movement of the cam lever 227 about its pivot 228 from the position shown in FIG. 10 also moves the knee pivot 237, and the link 259 which is attached thereto, to the left rotating the latch member 261 clockwise until a stop portion 319 engages an adjustable stop 321 which is mounted on the side plate 90 (FIG. 2). It must be noted that, until the stop portion 319 of the latch member 261 engages the stop 321, the toggle 229, 233 is in a thrust transmitting position being underset to a position where the stop portion 241 on the link 233 engages the connecting or stop portion 239 of the link 229. After the stop portion 319 of the latch member 261 engages the stop 231, the link 259 remains stationary, holding the pivot 237 stationary, and further clockwise rotation of the cam lever 227 breaks the toggle 229, 233 to the slightly collapsed underset position shown in FIGS. 1, 2, 5 and 8. During the first part of the spring charging operation, the force of the closing spring 57 (FIG. 4), was transmitted through the rod 181 tending to rotate the crank shaft 184 and lever 225 clockwise. The lever 225, however, could not rotate clockwise because this force was transmitted through the thrust-transmitting toggle 229, 233 to the lever 227 tending to rotate the lever 227 counterclockwise which movement was prevented by the cam roller 221 and worm gear 215. When the toggle 229, 233 breaks to the slightly collapsed underset position shown, for example in FIG. 5, the force of the closing spring tending to rotate the lever 225 clockwise is transferred through the collapsed toggle 229, 233 to the link 259 and latch member 261 tending to rotate this member in a counterclockwise direction. This counterclockwise movement of the latch member 261 is now prevented by the roller 275 of the rocker latch 269 which engages the latch point 279 of the rocker 201 to latch the circuit breaker mechanism in the spring-charged position in the same manner previously described. The motor 61 (FIGS. 1 and 2) is stopped, in a manner to be hereinafter described, when the worm gear 215 reaches the spring-charged position shown, for example, in FIGS. 2 and 5.

The operation of the operating mechanism 25 will be briefly summarized with reference to FIGS 4 through 10. The circuit breaker mechanism is shown in FIG. 5 in the closed and spring-charged position. Assuming that the breaker is tripped open by operation of the solenoid 139, the operating linkage 53 first collapses to the temporary trip-free position shown in FIG. 6, and then it is immediately reset to the thrust-transmitting reset position shown in FIG. 7. During the resetting of the operating linkage 53, the pin 75 carries the slotted link 77 to the position in which it is shown in FIG. 8. As was previously mentioned, the slotted link 77 connects the operating linkage 53 with the spring closing linkage 59. With the operating linkage 53 in the thrust transmitting position shown in FIG. 7, and the spring closing linkage in the charged position shown in FIG. 8, the circuit breaker is prepared for a spring closing operation. Upon energization of the closing electromagnet 287, the spring-closing linkage 59 is collapsed under the force of the closing spring 57 (FIG. 4) to the temporary discharged position in which it is shown in FIG. 9. This forceful collapse of the spring closing linkage 59 moves the slotted link 77 to the right moving the pin 75 to the right from the position shown in FIG. 7 to the position shown in FIG. 5. This moves the operating linkage 53 from the reset position shown in FIG. 7 to the position shown in FIG. 5 to effect closing of the circuit breaker contacts in the same manner previously described. The discharged position of the spring closing linkage shown in FIG. 9 is only temporary. In a manner hereinafter to be described, the motor 61 (FIGS. 1, 2 and 3) is automatically started during the closing operation, and the worm gear 215 is rotated clockwise moving the cam roller 221 from the position shown in FIG. 9 to the position shown in FIG. 10. This allows the closing linkage 59 to reset to the position shown in FIG. 10. This reset position shown in FIG. 10 is also temporary because the motor is, at this time, running and the worm gear 215 is still moving in a clockwise direction. When the worm gear 215 has made one complete revolution returning to the position shown in FIG. 5, the motor is stopped and a brake is applied to prevent undue coasting of the worm gear in a manner hereinafter to be described. The complete revolution of the worm gear 215 from the position shown in FIG. 9, through the position shown in FIG. 10, returning to the original position as shown in FIG. 5, effects charging of the closing spring in the same manner hereinbefore described. With the parts in the position shown in FIG. 5, the closed, spring-charged circuit breaker is ready for another tripping and spring closing operation.

It is not critical that the motor stop the worm gear 215 at the exact spot shown in FIG. 5. It is necessary only that the worm gear be rotated until the stop portion 319 of the latch member 261 engages the stop 321 to effect a break of the toggle 229, 233 to the slightly underset position shown in FIG. 5. If the worm gear 215 were not stopped in the position shown in FIG. 5, and if it were rotated even an additional few total revolutions, the operating linkage 53 and closing linkage 59 would remain in the positions shown in FIG. 5. Means, however, are provided to stop the motor 61 when the worm gear 215 is in the position shown in FIG. 5, and to brake the worm gear when it reaches this position. Thus, consistent timing is provided for each spring charging operation.

Referring to FIG. 2, a brake lever 325 is pivotally supported on a pin 327 that is connected to the worm gear housing 217. A cam roller 329 is mounted on the lever 325 near the upper end thereof. An adjustable bolt 331 is also mounted on the upper end of the lever 325 to cooperate with a roller 333 attached to a switch arm 335 of a limit switch indicated generally at 337. A block of brake lining 339 is attached to the lower end of the lever 325 to cooperate with a brake disc 341 that is attached to the shaft of the motor 61. A collapsible shaft assembly comprising an outer shaft 343 and an inner shaft 345 is indicated generally at 347. The shaft assembly 347 is supported at one end by a pin 349 that connects the inner shaft 345 with the lower end of the brake lever 325. The shaft assembly 347 is slidably supported near its free end by a projection 351 cast integral with the housing 217, the outer shaft 343 extends through an opening in the projection 351. An adjustable bolt 353 is mounted in the free end of the outer shaft 343, and cooperates with a projection 355 cast integral with the closing lever 225. A spring 357 fits over the outer shaft 343 and is positioned between the projection 35 of the housing 217 and a washer 359 attached to the outer shaft 343. The spring 357 biases the shaft assembly 347 to the left as viewed in FIG. 2. A spring 361 fits over the outer shaft 343 and inner shaft 345, and is positioned between a washer 363, which is fixed to the outer shaft 343, and the lower end of the brake lever 325. As viewed in FIG. 2 the spring 361 biases the shaft assembly 347 to the left, and it also biases the lower end of the brake lever 325 to the right.

The circuit breaker mechanism 25 is shown, in FIG. 2, in the closed position with the closing spring charged. When the mechanism is released to close the breaker, the lever 225 is rotated clockwise about its pivot 189, moving the projection 355 away from the bolt 353 to allow the collapsible shaft assembly 347 to move to the left under the bias of the spring 357. This moves the lower end of the brake lever 325 to the left disengaging the brake lining 339 from the brake disc 341. The upper end of the brake lever 325 moves to the right pivoting the switch arm 335 clockwise to operate the limit switch 337 to start the motor 61. The motor 61 then drives the worm 213 (FIG. 3) to rotate the worm gear 215 in a clockwise direction to charge the closing spring 57 (FIG. 4). During the spring charging operation, when the worm gear 215 has rotated approximately 270° from the position shown in FIG. 2, the closing lever 225 returns to a position where the projection 355 again engages the bolt 353 pushing the outer shaft 343 to the right. The brake lever 325, however, remains in its clockwise brake-open and switch-on position because, at this time, a cam 365 (shown in dotted lines in FIG. 2), which is attached to the worm gear 215, engages the roller 329 to keep the brake lever 325 open. In this position (not shown) the inner shaft 345 moves within the outer shaft 327, and the spring 361 is compressed between the washer 363 and the lower end of the lever 325. As the worm gear 215 makes a complete revolution from the position shown in FIG. 2, the roller 329 rides off of the cam 365, and the lever 325 is returned, under the bias of the expanding spring 361, to the position shown in FIG. 2. During this return, the switch arm 335 moves to open the switch 337 and force the brake lining 339 against the brake disc 341 to stop the motor 61 without undue coasting.

Means are provided for charging the closing spring (FIG. 4) by a hand-winding operation in case of the failure of motor power. A collapsible shaft assembly indicated generally at 369 (FIG. 2) is provided comprising an outer shaft 371 and an inner shaft 373. One end of the shaft assembly 369 is rotatably supported in a projection 375 cast integral with the housing 217, and the other end is supported in a U-shaped bracket 377. The outer shaft 371 is biased to the left as viewed in FIG. 2 by a spring 381 that fits over the shaft and is positioned between one of the legs of the U-shaped bracket, and a washer 383 attached to the shaft 371. In operation, a handle (not shown) is connected to the outer end of the shaft 371 which is then pressed in against the bias of the spring 381 until two slots 385 (only one being shown) at opposite sides of the outer shaft 371 engage a pin 387 that extends through the inner shaft 373. The handle is then rotated to rotate the inner shaft 373 and a gear 389 attached to the end thereof. Rotation of the gear 389 effects rotation of a gear 391 that is attached to the end of the worm 213 (FIG. 3) to operate the worm gear 215 and charge the closing spring 57 (FIG. 4) in the same manner previously described. When released, the shaft assembly 369 returns to the position shown in FIG. 2 under the bias of the expanding spring 381.

Figure 11:
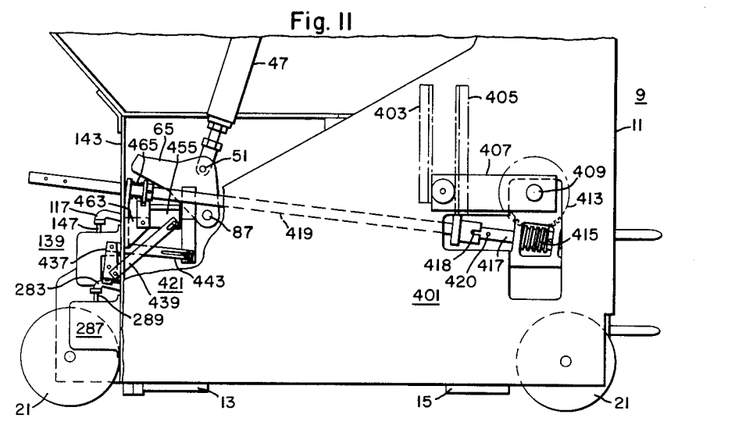
FIG. 11 is an elevational view, with part of the side panel broken away, of the lower part of the circuit breaker unit.

Turning now to FIG. 11, the lower part of the circuit breaker unit 9 is shown with the side plate 11 in place, but partly broken away. A device which is known in the metal-clad switchgear art as a levering-in device, is indicated generally at 401 for moving the circuit breaker unit 9 into and out of the connected position in a cell or cubicle. The levering-in device 401 is of the type specifically described and claimed in the patent to R. E. Frink et al., Patent No. 2,900,464 titled "Metal-Clad Switchgear" and assigned to the assignee of the instant application. For this reason, only a brief description of the levering-in device will be given herein. In FIG. 11, the levering-in device is shown positioned as if the circuit breaker unit 9 were in the connected position in a cell. Although the cell is not shown, cooperating angle members 403 and 405, which are part of the cell, are indicated in dot and dash lines. A pair of these angle members 403 and 405 are mounted at each side of the cell structure. The levering-in device 401 comprises a pair of lever arms 407 (only one being shown). The lever arms 407, which are located one on each side of the breaker, are secured together by a shaft 409 that is rotatably mounted in the circuit breaker unit. A roller 411 is rotatably mounted near the free end of each lever arm 407. A worm gear 413 is attached to the shaft 409. The worm gear 413 and lever arm 407 are rotated by a worm 415 which is supported in the circuit breaker unit and is connected to a shaft 417. An operating shaft 419, which is biased by spring means (not shown) to the disconnected position, is provided for operation of the levering-in device 401. In operation, the shaft 419 is pressed in until two slots 418 (only one being shown), at the end thereof, engage a pin 420 in the shaft 417. The shaft 419 is then rotated counterclockwise to rotate the shaft 417 and worm 415 which rotates the worm gear 413 and lever arms 407 clockwise. This movement of the lever arms 407 moves the rollers 411 in the slots between the members 403 and 405 which are secured to the sides of the cell structure, thereby moving the circuit breaker unit 9 from the connected position (FIG. 11) to the test position (not shown) in the cell. When the circuit breaker is in the test position, clockwise rotation of the shaft 419 will cause counterclockwise movement of the lever arms 407 and movement of the circuit breaker unit 9 from the test position to the connected position shown in FIG. 11.

Improved interlocking means, indicated generally at 421, are provided to prevent a closing operation when the circuit breaker unit 9 is being moved from the test position to the connected position or from the connected position to the test position. The interlocking means 421 also serves to prevent release of the powerful closing spring at any time when the breaker is in the closed position. Otherwise the spring, having no work to do, would cause unnecessary slamming and possible damage to the parts.

Figures 12, 14:
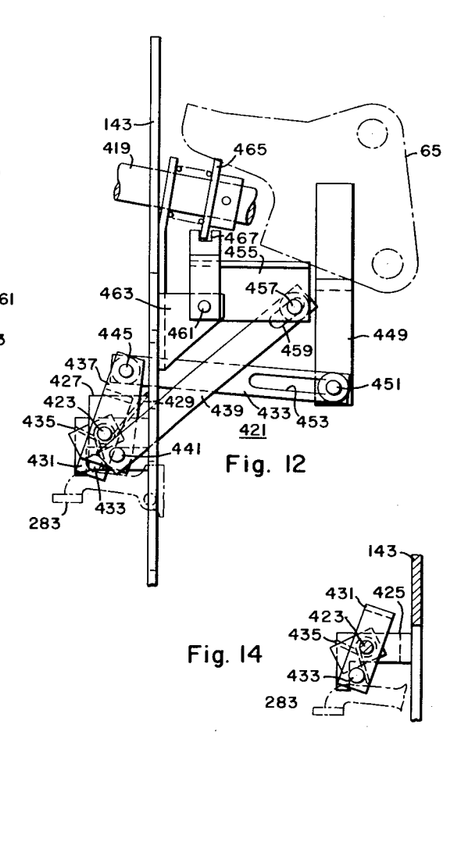
FIG. 12 is an elevational view, on an enlarged scale, of the interlocking means shown in FIG. 11.
FIG. 14 is a view taken along lines XIV—XIV of FIG. 13.
Figure 13:
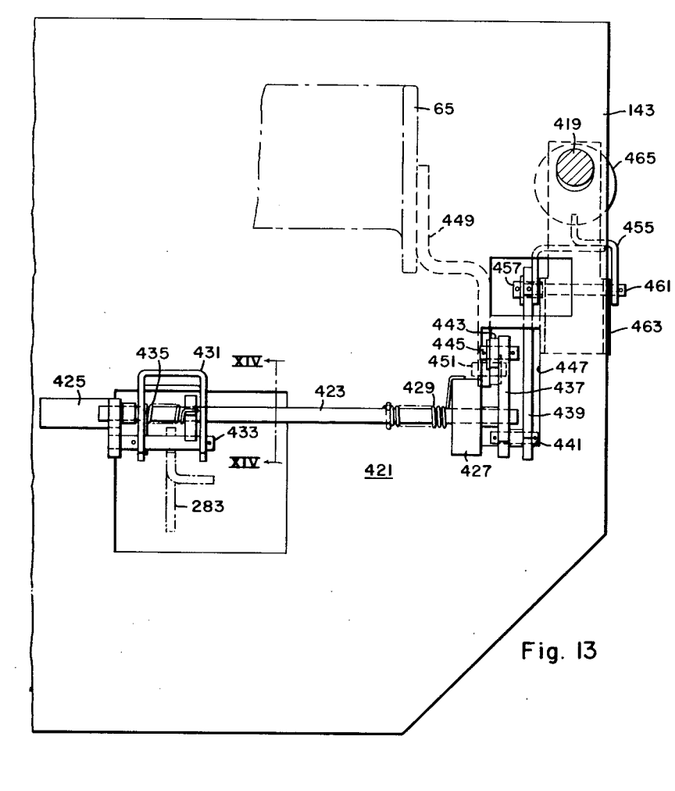
FIG. 13 is a front view of the interlocking means shown in FIG. 12.

As best illustrated in FIG. 13, the interlocking means 421 includes a shaft 423 which is rotatably mounted at opposite ends thereof in bearings in brackets 425 and 427, which brackets are attached to the front plate 143. A torsion spring 429 biases the shaft 423 in a counterclockwise direction. A U-shaped blocking member 431 having a blocking pin 433 mounted between its legs is rotatably mounted on the shaft 423. A torsion spring 435 biases the blocking member 431 in a clockwise direction. A lever 437 is mounted, intermediate its ends, on the outer end of the shaft 423. A link 439 is pivotally connected at one end to the lower end of the lever 437 by a pin 441. A link 443 (FIG. 12) is pivotally connected at one end to the upper end of the lever 437 by a pin 445. The links 439 and 443 extend through an opening 447 (FIG. 13) in the front plate 143. The link 443 (FIG. 12) is connected to a lever 449 by a pin 451 that moves in a slot 453 in the link 443. The lever 449 is welded or otherwise connected to the operating lever 65. The link 439 is connected to a bell-crank lever 455 by a pin 457 that moves in a slot 459 in the link 439. The bell-crank lever 455 is pivotally mounted on a pin 461 that is supported by a bracket 463 that is attached to the inner side of the front plate 143. A washer 465 attached to the shaft 419 fits within a slot 467 in the upper leg of the bell-crank lever 455.

The interlocking device 421 prevents release of the closing spring when the circuit breaker is closed. This closed-breaker position of the interlocking device 421 is illustrated in FIGS. 11–14. The operating lever 65 operates through the lever 449 and slotted link 443 to maintain the shaft 423 and blocking member 431 rotated to a position where the blocking pin 433 prevents releasing movement of the closing latch 283. When the circuit breaker is tripped open, the operating lever 65 moves the pin 451 of the lever 449 to the left as viewed in FIG. 12. This movement permits movement to the left of the link 443 permitting counterclockwise rotation of the lever 437 and shaft 423 under the bias of the spring 429. Counterclockwise rotation of the shaft 423 rotates the blocking member 431 counterclockwise to a position where the blocking pin 433 no longer prevents releasing movement of the closing latch 283. When the circuit is then closed, the operating lever 65 moves the parts to the position shown in FIGS. 11–14 in which position the blocking member 431 again blocks tripping movement of the closing latch 283. If the closing latch is in the released or raised position when the circuit breaker is closed, rotation of the shaft 423 will wind up the spring 435 so that the blocking member 431 will follow the closing latch 283 as it sets, to then prevent release of the closing latch 283.

The interlocking device also prevents release of the closing spring to prevent a closing operation when the circuit breaker unit 9 is being moved from the test position to the connected position in a cell, or from the connected position to the test position. Referring to FIG. 11, it was previously explained that the levering-in device can be operated only when the shaft 419 is pressed in until the notches 418 engage the pin 420 which extends through the shaft 417. As is best illustrated in FIG. 12, the interlocking device 421 is in blocking position because the circuit breaker is closed. If the circuit breaker were open, the lever 65 would move the pin 451 of the lever 449 to the left allowing the lever 437 to rotate counterclockwise to allow movement of the blocking member 431 counterclockwise to its unblocking position. Counterclockwise movement of the lever 437 operates, through the pin 441, to move the link 439 up and to the right as viewed in FIG. 12 until the pin 457 of the bell-crank 455 is at the lower end of the slot 459 in the link 439. Assuming that the circuit breaker is open so that the parts are in this position, operation of the levering-in device will effect movement of the interlocking device 421 to the blocking position to prevent releasing movement of the closing latch 283. When the shaft 419 is pressed in, the washer 465, engaged in the notch 467 of the bell-crank lever 455, moves the lever 455 clockwise, forcing the link 439 to move the lever 437 clockwise, moving the blocking member 431 to the blocking position shown in FIGS. 11-14. When the circuit breaker is in position, and the shaft 419 is released returning to its unconnected position, the washer 465 operates to move the bell-crank 455 counterclockwise to allow the link 439 to move up and to the right permitting counterclockwise rotation of the lever 437 and shaft 423 to the unblocking position under the bias of the spring 429. This rotates the blocking member counterclockwise back to its unblocking position to permit releasing movement of the closing latch 283. The slots 453 and 459 in the links 443 and 439 respectively, permit operation of either link irrespective of the other.

Figure 15:
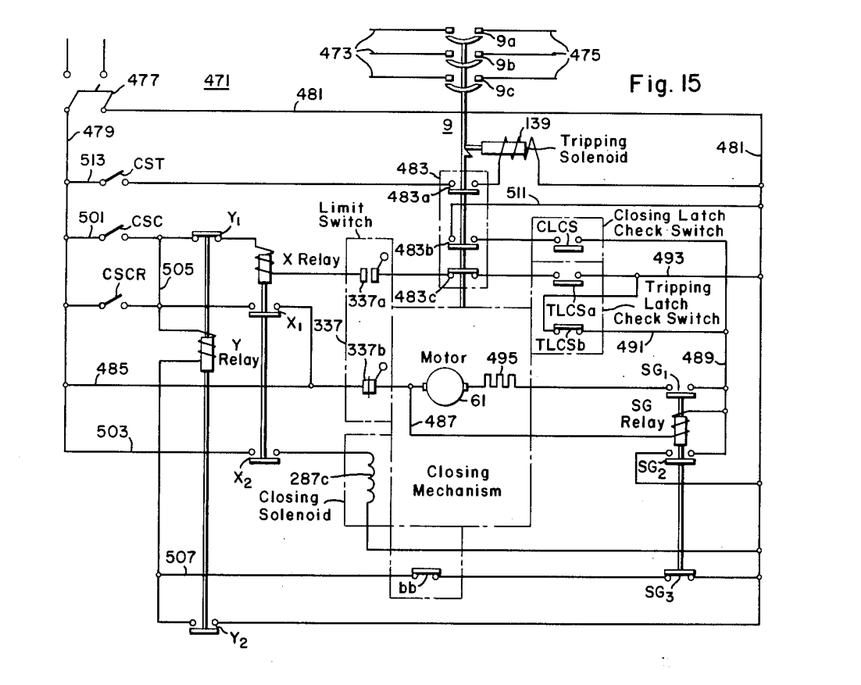
FIG. 15 is a diagrammatic view illustrating the electrical circuits of the invention.

The circuit breaker control system is illustrated diagrammatically in FIG. 15; the system being indicated generally by the reference numeral 471. The three-pole circuit breaker, indicated generally at 9, is shown for effecting connection of conductors 473 to associated conductors 475. The circuit breaker has three contact members, indicated at 9a, 9b and 9c, for controlling the flow of electrical energy between the conductors 473 and 475. Conductors 479 and 481 are connected, through a knife switch 477, to a suitable source of control voltage for supplying power to the system 471. The limit switch 377 (FIG. 2) for controlling operation of the motor is shown as 337a and 337b. The contacts 337a are open when the closing spring is discharged or not fully charged, and they close as soon as the charging operation has been completed. The contacts 337b are closed when the spring is discharged or not fully charged, and they open when the charging operation has been completed. A switch "bb" is operated from the latch member 261 (FIG. 2) in such a manner that it is closed when the closing spring 57 is not charged and it opens when the closing spring 57 is charged and latched. A tripping-latch-check switch is operated from the tripping latch 117 (FIG. 2). This switch has normally open contacts $TLCS_a$, and normally closed contacts $TLCS_b$. The tripping-latch-check switch is in the normal position when the tripping latch 117 is in the "up" position shown in FIG. 6 i.e. when the tripping linkage 53 is in the trip-free position. A closing-latch-check switch having contacts CLCS is provided. This switch is operated from the latch 89. This switch is open when the circuit breaker is open, and it closes when the latch 89 reaches the latched or closed position shown in FIG. 5. A switch 483, which is operated by the operating lever 65 (FIG. 2), has normally open contacts $483_a$ and $483_b$, and normally closed contacts $483_c$. Three relays X, Y and SG are provided in the circuit. The X relay operates normally open contacts $X_1$ and $X_2$. The Y relay operates normally closed contacts $Y_1$, and normally open contacts $Y_2$. The SG relay operates normally open contacts $SG_1$ and $SG_2$, and normally closed contacts $SG_3$.

In FIG. 15, the control system 471 is shown with the circuit breaker open and closing spring discharged. The knife switch 477 is open so that the circuits of the system are all deenergized.

In operation, the knife switch 477 is closed to energize the system 471. This completes an energizing circuit, for the SG relay, through the conductor 479, a conductor 485, limit switch contacts $337_b$, a conductor 487, SG relay coil, a conductor 489, a conductor 491, tripping-latch-check switch contact $TLCS_b$, a conductor 493, and the conductor 481.

The SG relay picks up to open the $SG_3$ contacts, and close the $SG_1$ and $SG_2$ contacts. The SG relay is now held in by the contacts $SG_2$. The closed contacts $SG_1$ complete the motor circuit through the conductors 479 and 485, limit switch contact $337_b$, motor 61, a resistor 495 (for 48 v. D.C. control only), contacts $SG_1$, conductor 489, contacts $SG_2$ and the conductor 481. The motor circuit also extends through the conductor 489, conductor 491, contacts $TLCS_b$, conductor 493 and the conductor 481. The motor 61 runs to effect charging of the closing spring 57 (FIGS. 3 and 4) in the same manner previously described.

When the breaker is open and the spring is discharged, the tripping linkage 53 is in the trip-free position shown in FIG. 6, and the closing linkage 59 is in the discharged position shown in FIG. 9. As was previously described, the tripping linkage 53 does not immediately reset in this situation because of the restraining force of the discharged closing linkage 59, which force is exerted through the slotted link 77. As the closing spring 57 is being charged, the closing linkage 59 and slotted link 77 move from the positions shown in FIG. 9 to the positions shown in FIG. 8. This movement allows the tripping linkage 53 to reset from the position shown in FIG. 6 to the position shown in FIG. 7. When the closing spring 57 is completely charged, the roller 109 on the rocker latch 103 rides off of the cam surface 115 of the latch member 97 allowing the rocker latch 103 and tripping latch 117 to move to the positions shown in FIG. 7 under the bias of the torsion springs 133 and 127 (FIG. 4) respectively. As the tripping latch 117 drops, it operates the tripping-latch-check switch (FIG. 15) to close the contacts $TLCS_a$ and open the contacts $TLCS_b$. In the very next instant, the latch member 261 operates the switch "bb" (FIG. 15) to the open position. As was previously described, the limit switch 337 is operated, by the brake lever 325 (FIG. 2), during a spring-charging operation.

When the closing spring 57 is fully charged, the switch arm 335 (FIG. 2) is operated to open the contacts $337_b$ (FIG. 15) and close the contacts $337_a$. As the contacts $337_b$ are opened, the motor current is cut off and the SG relay is deenergized to open the contacts $SG_1$ and $SG_2$, and close the contacts $SG_3$.

With the closing spring fully charged and latched, the breaker can be closed electrically by operation of either the closing control switch CSC or the remote closing control switch CSCR. Closing the control switch CSC (for example) completes an energizing circuit for the X relay through the conductor 479, a conductor 501, the control switch CSC, contacts $Y_1$, X relay coil, limit switch contacts $337_a$, contacts $483_c$, contacts $TLCS_a$ (which are always closed when the closing spring is charged), the conductor 493 and the conductor 481. The X relay picks up to close the contacts $X_1$ and $X_2$. Closing of the contacts $X_2$ completes an energizing circuit for the closing solenoid coil $287_c$. This circuit extends through the conductor 479, a conductor 503, contacts $X_2$, closing solenoid coil $287_c$, and the conductor 481. Energization of the closing solenoid coil $287_c$ effects operation of the closing solenoid 287 (FIGS. 1 and 5) and closing of the circuit breaker in the same manner hereinbefore described.

As soon as the closing movement of the linkages starts, the "bb" circuit closes so that, if the operator is still holding the closing control switch CSC closed, a Y relay circuit will be completed through the conductor 479, conductor 501, switch CSC, a conductor 505, Y relay, a conductor 507, bb contacts, contacts $SG_3$ and the conductor 481. The Y relay would then pick up to open the $Y_1$ contacts to deenergize the X relay circuit. The X relay would drop out to open the $X_2$ contacts and interrupt the current through the closing solenoid coil $287_c$. The Y relay would be held in through the $Y_2$ contacts until the operator would open the closing control switch CSC to deenergize the Y relay circuit.

As soon as the linkages start to close, the limit switch 337 (FIG. 2) is operated through movement of the closing lever 225, projection 355, collapsible shaft assembly 347, brake lever 325 and switch arm 335. The switch arm 335 operates to close the contacts $337_b$ (FIG. 15) and open the contacts $337_a$. This completes the circuit for energizing the SG relay, and this relay picks up and seals itself in to operate the motor 61 in the same manner previously described.

When the circuit breaker is in the closed position and the closing spring is discharged, the contacts $TLCS_b$ are open and the SG relay cannot be energized through these contacts to start the motor 61. If the latch 89 is in its proper latched position (FIGS. 2 and 5), the SG relay picks up, to start the motor 61, through a circuit parallel to the $TLSC_b$ contacts. The closing-latch-check switch contacts CLCS are closed only when the breaker is closed and the latch 89 is in the latched position shown, for example, in FIG. 5. The SG relay energizing circuit, in this situation, includes the conductors 479 and 485, contacts $337_b$, conductor 487, SG relay, conductor 489, contacts CLCS, contacts $483_b$, conductor 511, and conductor 481.

It can be understood that the closing-latch-check switch assures that the breaker will fail safe if, for some reason, the latch 89 is prevented from latching the tripping linkage 53 in the closed position when the closing spring 57 is discharged. This problem will be better understood by assuming that the tripping linkage 53 is in the closed position in which it appears, for example, in FIG. 5, and that the closing linkage 59 is in the discharged position shown in FIG. 9. In FIG. 5, the latch 89 is in the latched position holding the tripping linkage 53 closed so that the breaker is closed. If the latch 89 were not in the latched position, and the closing spring were discharged, the breaker would be held closed by the force of the expanded closing spring. This spring would operate through the closing linkage 59 and slotted link 77 (FIG. 9) to hold the tripping linkage 53 in the position in which it is shown in FIG. 5. If the motor 61 were started with the breaker closed and the latch 89 not properly latched, it would operate to slowly move the closing linkage 59 from the discharged position shown in FIG. 9 through the reset position shown in FIG. 10 to the charged position shown in FIG. 8. This movement, through movement of the slotted link 77 and pin 75, would allow the tripping linkage 53 to open slowly under the forces of the tripping spring 149 (FIG. 4), accelerating springs (not shown) and the weight of the movable contact assembly. The tripping linkage 53 would move from the closed position shown in FIG. 5 to the reset position shown in FIG. 7 even though the latching and tripping mechanism would be latched as shown in both of these figures. If the circuit breaker were allowed to open as slowly as the travel of the worm gear 215, the arc generated between the contacts would cause severe damage to the contacts and arc extinguishing means.

This slow opening operation is prevented in the instant case because the closing-latch-check switch will be closed by the latch 89, to complete the SG relay energizing circuit, only when this latch properly sets in the latched or closed position shown in FIGS. 2 and 5. With the closing linkage 53 properly latched in the closed position shown, for example, in FIG. 5, and the closing spring 59 discharged with the closing linkage being in the discharged position shown in FIG. 9, the SG relay energizing circuit previously mentioned is made through the closed contacts CLCS. The motor 61 is now started to charge the closing spring 57, moving the closing linkage from the discharged position shown in FIG. 9, through the reset position shown in FIG. 10, to the charged position shown in FIGS. 2 and 5. While the closing linkage 59 is being moved to the charged position, the breaker remains latched in the closed position holding the slotted link 77 in position, and the pin 201 moves within the slot 78 (FIG. 8) of the slotted link 77 to the position shown in FIGS. 2 and 5. At the end of this spring charging operation, the tripping linkage 53 and the closing linkage 59 are both latched in the positions shown in FIGS. 2 and 5.

The circuit breaker is tripped open by energization of the tripping solenoid 139, FIG. 1. The tripping circuit extends through the conductor 479 (FIG. 15), a conductor 513, a tripping control switch CST, contacts 483ₐ, tripping solenoid 139, and conductor 481. Closing the switch CST completes the tripping circuit to operate the tripping solenoid 139 to effect a tripping operation in the manner hereinbefore described. Although not shown in the drawings, the circuit breaker may be provided with well known means such as a fault relay to effect energization of the tripping solenoid 139 upon the occurrence of an abnormal current condition such, for instance, as an overload current in the conductors 473, 475 (FIG. 15).

From the foregoing description, it is apparent that the invention provides a circuit breaker embodying an improved motor-operated stored-energy closing mechanism. Two sets of linkages are operatively connected together by a slotted link. One of the sets of linkages is collapsible to effect opening of the breaker, and the other set is collapsible to effect closing of the breaker. Means are provided to assure that the closing linkage will not collapse during a charging operation until the stored-energy means is fully charged.

The motor operates to drive a rotating shaft which effects charging of the stored-energy means. Switch-controlling means are provided for controlling operation of the motor, and brake means are provided for controlling rotation of the shaft. The switch-controlling means and brake means are simultaneously operated by movement of opposite ends of a lever that is pivoted intermediate its ends.

The breaker is provided with a levering-in device for moving the breaker into and out of the connected position in a cell or cubicle. Improved interlocking means are provided to prevent a closing operation of the breaker when the levering-in device is being operated. Interlocking means are also provided to prevent release of the charged stored-energy means when the breaker is in the closed position.

A novel electrical control system is provided for operation of the breaker. The control system is adapted to prevent the occurrence of a slow opening operation upon the failure of one of the latch members.

Having described the invention in accordance with the patent statutes, it is to be understood that various changes and modifications may be made in the structural details thereof without departing from some of the essential features of the invention.

We claim as our invention:

1. In a circuit breaker having separable contacts and means releasable to effect automatic separation of said contacts, stored-energy means releasable to effect a closing operation of said circuit breaker, a linkage, a motor, connecting means operatively connecting said motor with said linkage, upon energization of said motor said connecting means operating through said linkage when said linkage is in thrust transmitting position to charge said released stored-energy means, means breaking said linkage from the thrust transmitting position to a partially collapsed position after said stored-energy means is charged, when said linkage is moved to said partially collapsed position said connecting means being positioned so as to not interfere with continued operation of said motor, means latching said partially collapsed linkage, said partially collapsed linkage being collapsible to release said stored-energy means to effect a closing operation of said circuit breaker, and means for releasing said latching means to allow said partially collapsed linkage to collapse.

2. A circuit breaker comprising, in combination, stationary contact means and movable contact means cooperable therewith to open and close the circuit breaker, an operating linkage latched when said breaker is closed and releasable to effect opening of said breaker, stored-energy means releasable to effect closing of said breaker, a closing linkage in a latched position when said stored-energy means is charged and releasable to release said charged stored-energy means, a motor, cam means comprising a first cam member and a second cam member, means operatively connecting said first cam member with said motor, upon energization of said motor said first cam member moving in operative engagement with said second cam member to operatively move said second cam member to a charging position, said second cam member upon operative movement thereof to said charging position moving said closing linkage to said latched position, means stopping said motor when said second cam member is in said charging position and when said closing linkage is in said latched position, and said second cam member in said charging position being positioned out of operative engagement with said first cam member whereby if said stopping of said motor is delayed said first cam member can be moved by operation of said motor without interfering with said second cam member and without interfering with said closing linkage.

3. A circuit breaker comprising, in combination, stationary contact means and movable contact means cooperable therewith to open and close the breaker, a latched operating linkage, a latched closing linkage, lost motion means operatively connecting said operating linkage and said closing linkage, said operating linkage upon release collapsing to effect opening of said contact means, stored-energy means releasable to effect closing of said contact means, said closing linkage upon release collapsing to release said stored-energy means to effect closing of said contact means, a motor, cam means comprising a first cam member and a second cam member, means operatively connecting said first cam member with said motor, upon energization of said motor said first cam member being rotated and moving against said second cam member to operatively move said second cam member to a charging position, said second cam member upon operative movement thereof to said charging position moving said closing linkage to said latched position, means stopping said motor and said first cam member when said second cam member is in said charging position and when said closing linkage is in said latched position, and said second cam member in said charging position being positioned out of operative engagement with said first cam member whereby if said stopping of said motor is delayed said first cam member can rotate without interfering with the position of said second cam member and without interfering with the position of said closing linkage.

4. In a circuit breaker having relatively movable contacts and stored-energy means releasable to effect closing of said contacts, means for charging said stored-energy means, said charging means including a rotating shaft and an electric motor for driving said shaft, means operated by said rotating shaft for charging said stored-energy means, switch-controlling means operable when actuated to cause operation of said motor, means operatively associating said switch-controlling means with the circuit breaker in such a manner that said switch-controlling means is moved to its actuated position at a predetermined time in a closing operation of the circuit breaker and is moved to its non-actuated position only after said stored-energy means is completely charged, and a brake operable when said switch-controlling means is moved to its non-actuated position to stop rotation of said shaft.

5. In a circuit breaker having relatively movable contacts and stored-energy means releasable to effect closing of said contacts, means for recharging said released said stored-energy means, said recharging means including a rotating shaft and an electric motor for driving said shaft, means operated by said rotating shaft for charging said stored-energy means, switch-controlling means operative when actuated to cause the operation of said motor, means operatively associating said switch-controlling means with the circuit breaker in such a manner that said switch-controlling means is moved to its actuated position at a predetermined time in a closing operation of the circuit breaker and is moved to its non-actuated position only after said stored-energy means is completely recharged, brake means releasable to allow rotation of said shaft, and means releasing said brake means when said switch-controlling means is moved to its actuated position.

6. In a circuit breaker having relatively movable contacts and stored-energy means releasable to effect closing of said contacts, means for charging said released stored-energy means, said charging means including a rotating shaft and an electric motor for driving said shaft, means operated by said rotating shaft for charging said stored-energy means, switch-controlling means operative when actuated to cause the operation of said motor, means operatively associating said switch-controlling means with the circuit breaker in such a manner that said switch-controlling means is moved to its actuated position at a predetermined point in the closing operation of the circuit breaker and is moved to its non-actuated position only after said stored-energy means is completely charged, brake means releasable to allow rotation of said shaft, means releasing said brake means when said switch-controlling means is moved to its actuated position, and means applying said brake means to stop rotation of said shaft when said switch-controlling means is moved to its non-actuated position.

7. A circuit breaker including, in combination, stationary contact means and movable contact means cooperable therewith to open and close said circuit breaker, opening means operative at times to effect opening of said contact means, closing means operative at times to effect closing of said contact means, said closing means including stored-energy means releasable to effect closing of said contact means, means for releasing said stored-energy means, recharging means for recharging said released stored-energy means, said recharging means including a rotary shaft, an electric motor for driving said shaft, means operated by said rotating shaft for charging said spring means, switch-controlling means moved to its "on" position to cause the operation of said motor, means operatively associating said switch-controlling means with the circuit breaker in such a manner that said switch-controlling means is moved to its "on" position at a predetermined time during a closing operation of the circuit breaker and is moved to its "off" position only after said stored-energy means is completely recharged, brake means moved to its "on" position to stop rotation of said shaft, and means operatively associating said switch-controlling means and said brake means in such a manner that said brake means is "on" when said switch-controlling means is "off" and said brake means is "off" when said switch-controlling means is "on."

8. A circuit breaker including, in combination, stationary contact means and movable contact means cooperable therewith to open and close said breaker, means latching said breaker in a closed position, stored-energy means releasable to effect a closing operation of said breaker, means for charging said stored-energy means when said breaker is in a closed position, and means for preventing operation of said charging means when said breaker is in a closed position if said breaker is not latched in the closed position.

9. A circuit breaker comprising, in combination, stationary contact means and movable contact means cooperable therewith to open and close the breaker, means latching the breaker in a closed position, stored-energy means releasable to effect closing of the breaker, a motor operable to effect charging of said stored-energy means when said breaker is in a closed position, and means operated by said latching means for preventing operation of said motor when the breaker is in a closed position if the breaker is not latched closed.

10. A circuit breaker including, in combination, stationary contact means and movable contact means cooperable therewith to open and close said breaker, a trip-free linkage latched to hold said contact means closed and collapsible to effect opening of said contact means, latching means latching said trip-free linkage to hold said contact means closed and releasable to effect collapse of said trip-free linkage, means for effecting release of said latching means, a latch member latching said trip-free linkage to hold said contact means closed, stored-energy means releasable to effect closing of said contact means, a motor energized to effect charging of said released stored-energy means when said contact means are closed, and switch means preventing energization of said motor when said contact means are closed and said stored-energy means is discharged if said latch member is not in latching position.

11. A circuit breaker including, in combination, stationary contact means and movable contact means cooperable therewith to open and close said breaker, a trip-free linkage latched to hold said contact means closed and collapsible to effect opening of said contact means, latching means latching said trip-free linkage to hold said contact means closed and releasable to effect collapse of said trip-free linkage, electromagnetic means energized to effect release of said releasable means, a latch member, said latch member latching said trip-free linkage to hold said contact means closed, stored-energy means expending itself when released to effect closing of said contact means, a motor energized to effect charging of said expended stored-energy means, switch means preventing energization of said electromagnetic means when said contact means are closed and said stored-energy means is expended, and switch means preventing energization of said motor when said contact means are closed and said stored-energy means is expended if said latch member is not in latching position.

12. A circuit breaker comprising stationary contact means, movable contact means cooperable with said stationary contact means to open and close the circuit breaker, stored-energy means releasable to effect a closing operation of said circuit breaker, a linkage, a motor, cam means operatively connecting said motor with said linkage, upon energization of said motor said cam means operating through said linkage when said linkage is in thrust transmitting position to charge said released stored-energy means, means automatically operating to break said linkage from the thrust transmitting position to a partially collapsed position when said stored-energy means is charged, when said linkage is moved to said partially collapsed position said cam means being positioned so as to not interfere with continued operation of said motor, means de-energizing and stopping said motor when said stored-energy means is charged and said linkage is in said partially collapsed position, means latching said partially collapsed linkage, said partially collapsed linkage being collapsible to release said stored-energy means to effect a closing operation of said circuit breaker, means for releasing said latching means to allow said partially collapsed linkage to collapse, and means operating automatically upon the occurrence of a closing operation to energize said motor.

13. A circuit breaker comprising stationary contact means, movable contact means cooperable with said stationary contact means to open and close the circuit breaker, stored-energy means releasable to effect a closing operation of said circuit breaker, a linkage in thrust transmitting position, a motor having a rotatable output shaft, a cam operator movable upon rotation of said shaft, a cam member, upon energization of said motor said cam operator being moved to move said cam member whereupon said cam member operates through said linkage to charge said released stored-energy means, means automatically breaking said linkage from the thrust transmitting position to a partially collapsed position after said stored-energy means is charged, when said linkage is moved to said partially collapsed position said cam member being positioned so as to not interfere with continued movement of said cam operator and said output shaft, means operating automatically to de-energize said motor when said stored-energy means is charged and said linkage is moved to said partially collapsed position, means latching said partially collapsed linkage, said partially collapsed linkage being collapsible to release said stored-energy means to effect a closing operation of said circuit breaker, means for releasing said latching means to allow said partially collapsed linkage to collapse, and means operating automatically upon the completion of said closing operation to energize said motor.

References Cited by the Examiner

UNITED STATES PATENTS

| | | | |
|---|---|---|---|
| 1,853,745 | 4/32 | Rea | 200—92 |
| 1,938,408 | 12/33 | Thumim | 200—92 |
| 2,140,371 | 12/38 | Ow et al. | 200—92 |
| 2,156,072 | 4/39 | Thumim | 200—92 |
| 2,410,253 | 10/46 | Trogner | 200—92 |
| 2,482,757 | 9/49 | Frese | 200—92 |
| 2,792,461 | 5/57 | Frink et al. | 200—50 |
| 2,820,119 | 1/58 | Miller et al. | 200—92 |
| 2,840,653 | 6/58 | Caswell | 200—50 |
| 2,891,122 | 6/59 | Froland | 200—92 |
| 2,905,787 | 9/59 | Heintz | 200—92 |

BERNARD A. GILHEANY, *Primary Examiner.*

MAX L. LEVY, ROBERT K. SCHAEFER, *Examiners.*